United States Patent [19]

Smyth

[11] Patent Number: 4,541,657
[45] Date of Patent: Sep. 17, 1985

[54] QUICK RELEASE HOSE COUPLING

[75] Inventor: Donald N. Smyth, South Plympton, Australia

[73] Assignee: SABCO Ltd., Albert Park, Australia

[21] Appl. No.: 430,889

[22] Filed: Sep. 30, 1982

[30] Foreign Application Priority Data

Nov. 26, 1981 [AU] Australia .................. PF1723

[51] Int. Cl.⁴ .................................. F16L 37/12
[52] U.S. Cl. ............................. 285/305; 285/308
[58] Field of Search ............... 285/308, 305, 317; 339/91 R

[56] References Cited

U.S. PATENT DOCUMENTS

| | | | |
|---|---|---|---|
| 1,096,690 | 5/1914 | Derbyshire | 285/320 |
| 1,369,687 | 2/1921 | Martin | 285/317 |
| 1,513,710 | 10/1924 | Lewis | 285/305 X |
| 2,023,428 | 10/1935 | Liebhardt | 285/317 X |
| 3,428,340 | 2/1969 | Pelton | 285/308 X |
| 3,527,485 | 9/1970 | Goward et al. | 285/305 |
| 3,753,582 | 8/1973 | Graham | 285/305 |
| 3,948,547 | 4/1976 | Gache | 285/317 |
| 4,244,608 | 1/1981 | Stuemky | 285/305 |
| 4,331,177 | 5/1982 | Makishima | 285/308 X |

FOREIGN PATENT DOCUMENTS 2839635  4/1979  Fed. Rep. of Germany ...... 285/305

Primary Examiner—Thomas F. Callaghan
Attorney, Agent, or Firm—Oldham, Oldham & Weber Co.

[57] ABSTRACT

A hose coupling having a spigot member to be inserted into a socket in the body of the coupling. The member having a pair of legs diverging from a base forming a circumferential portion of the body. The legs engage in a circumferential groove in the spigot, so that by pressing on the circumferential portion the legs diverge to release the spigot.

7 Claims, 4 Drawing Figures

QUICK RELEASE HOSE COUPLING

This invention relates to hose couplings, and more particularly to a quick release coupling which enables the parts to be coupled together by merely inserting one part within the other, and easily uncoupled by pressing a portion of one of the coupling members.

BACKGROUND OF THE INVENTION

Many forms of couplings for the connection of hoses are well known, and these are often made of metal with a plurality of parts and which require springs to cause the engagement of the locking portions of the coupling.

Another form of coupling includes a spigot having a sealing O-ring at its end and spaced therefrom a circumferential groove, the other coupling member being a socket having a plurality of radially movable locking teeth or dogs which are forced inwardly by a sleeve movable axially on the member, a spring being provided to bias the sleeve to the locking position.

Thus with many of these known hose couplings while the locking is usually satisfactory, the coupling requires a large number of component parts which have to be individually made and assembled to form the coupling.

It is an object of this invention to provide a hose coupling which is simple in operation, provides a positive lock and seal, and also which only requires a minimum number of component parts.

STATEMENT OF THE INVENTION

Thus there is provided according to the invention a hose coupling, the coupling comprising a portion having a spigot adapted to be inserted into a socket in a second portion, said spigot having a sealing ring and an annular groove with the sealing ring adapted to seal in the socket of the second portion, said second portion having a transverse slot and a locking member co-operating with said slot, said locking member comprising a pair of legs attached to a part cylindrical portion, the legs being attached to the part cylindrical portion in such a manner that on straightening the part cylindrical portion the legs diverge, the legs being adapted to engage in said circumferential groove in said spigot member.

BRIEF DESCRIPTION OF THE DRAWINGS

In order to more fully describe the invention reference will now be made to the accompanying drawings in which.

DESCRIPTION OF THE PREFERRED EMBODIMENT

Figure 1:
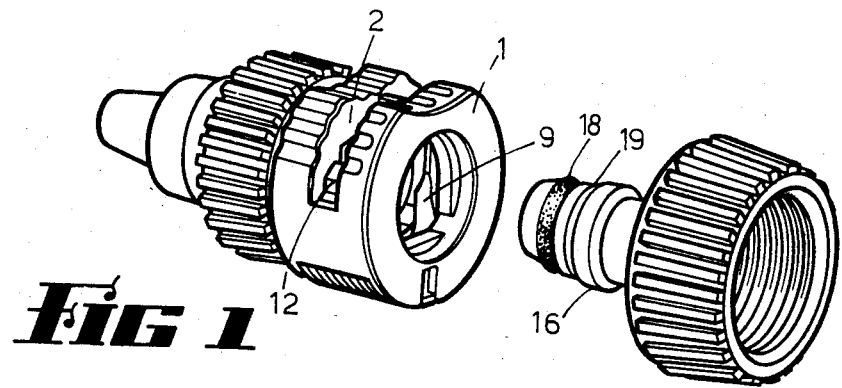
FIG. 1 is a perspective view of an uncoupled coupling.
Figure 2:
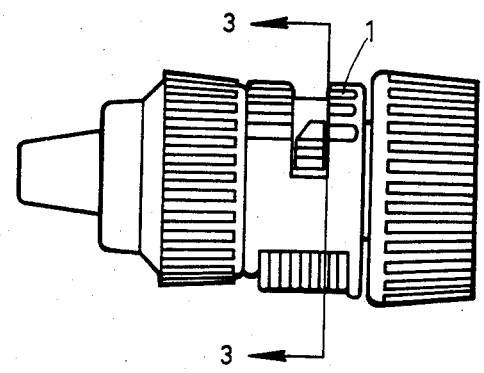
FIG. 2 is a side elevation of the coupling
Figure 3:
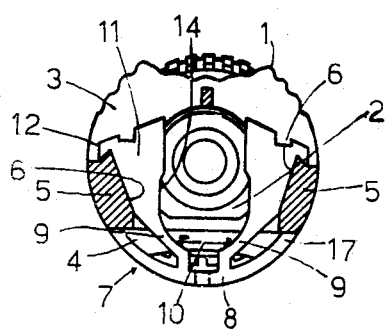
FIG. 3 is a crosssectional view on the lines 3—3 of FIG. 2 showing the locking member in the locked position.

The socket coupling member has a body 1 provided with a slot 2 through the body, there also being cut-outs 3 and 4 to leave abutments 5 connecting the two portions of the body 1. The slot 2 is formed as a tapering slot so that each of the abutments 5 has an inclined face 6.

The locking member 7 is provided with a part cylindrical base 8 to which are attached a pair of spaced legs 9. The legs 9 are spaced a small distance from each other, and extend at an included angle 10 away from the base 8. The legs then extend generally in the line of the face 6, but also increase in thickness to a portion 11 having a hook 12.

The locking member is formed of a suitable plastics material, and in the relaxed state of the locking member the sides 13 of the legs are at the same angle of the surfaces 6 on the abutments so that when the locking member is inserted in the locked position it sits in position in a free relaxed condition, the spigot of the other portion not being inserted.

Figure 4:
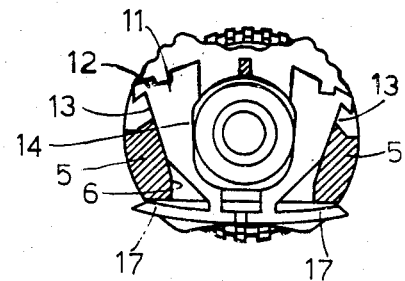
FIG. 4 is a similar view showing the locking member in the free position.

The attachment of the legs 9 to the base portion 8, the angle 10 included between the legs, and the thickness of the base portion 8 are such that when the centre of the base portion is depressed with the ends 17 of the base portion engaging on the body 1, that the base portion is bent and deflected to tend to straighten the base, and in so doing the legs automatically deflect away from each other to increase the included angle between the legs, with the legs moving through the slot to the position shown in FIG. 4 at which time the inside surfaces 14 of the legs are at least equal to the diameter of the spigot.

The legs may also be provided with a sloping recessed or champered portion so that on the spigot being inserted the spigot is merely clipped into position.

The spigot 16 is provided with the usual sealing ring 18 and locking groove 19 into which the legs 9 can engage.

When the spigot is to be clipped into position the spigot is pushed into the body with the tapered end of the spigot engaging on the tapered or champered portion of the legs, so that these then spread and move through the slot, straightening the base unitl the legs engage in the circumferential slot on the spigot when the resiliency of the base causes the base to again return to its curved shape holding the legs securely in the circumferential slot on the spigot.

To release the spigot is merely necessary to press on the curved portion of the base, tending to straighten the base to thus move the legs through the slot and to cause the legs to be spread to increase the included angle between the legs.

Thus it will be seen that it is only the pressing on the base which causes the legs to spread, and that in the unassembled condition of the spigot and body that the legs merely rest on the sides of the slot, with the hooked portion of the legs engaging over the abutment portion of the slot to retain the legs and locking member in position in the slot.

The angle of the faces on the abutments is chosen so that when the base is depressed that the legs move through the slot along this angle and thus the effectiveness of the unit is apparently achieved by the angle between the leg, the slight spacing of the legs, and the angle on the abutments.

Thus it will be seen that there is provided a coupling in which there is only one locking member which is readily inserted into the slot, and that no other members, movable sleeves, levers or springs or the like are required but only the one locking member as described.

It will be realised that one or both of the members of the coupling are provided with means for attachment to a hose, sprinkler or the like, and the hose coupling member itself could be a threaded member which is formed with a taper, and which can be screwed into a hose.

Around the outside of the hose there would be a ferrule or the like so that when the member is screwed into the hose that the hose is locked between the threaded member and the ferrule.

Although one form of the invention has been described in some detail it is to be realised that the invention is not to be limited thereto but can include various modifications falling within spirit and scope of the invention.

The claims defining this invention are as follows:

1. A hose coupling, the coupling comprising
a portion having a spigot adapted to be inserted into a socket in a second portion,
said spigot having a sealing ring and an annular groove with the sealing ring adapted to seal in the socket of the second portion,
said second portion having a transverse slot for receiving a locking member,
said locking member comprising a pair of legs attached to a part cylindrical portion, said part cylindrical portion forming a continuation of the outer surface of said second portion, a cut out portion across said second portion, said part cylindrical portion being positioned in said cut out, the ends of said part cylindrical portion abutting on the edges of said cut out, so that when the centre of the part cylindrical portion is depressed, the part cylindrical portion straightens to cause the legs to move through the slot and to diverge,
the legs being adapted to engage in said annular groove in said spigot member,
the legs being characterized in that each leg increases in dimension radially from said part cylindrical portion to the outer end of the legs,
each leg being provided with a hook on its radially outer surface at its outer end to engage a ledge formed by a cut out crossing said slot to retain the locking member in its non-engaged position.

2. A hose coupling as in claim 1 where said second portion has a pair of spaced opposed abutments formed in said slot, and said legs include thickened end sections that engage portions of said abutments to spread said legs when said cylindrical portion is pressed inwardly.

3. A hose coupling as in claim 2 where said locking member is made of flexible plastic and said legs move relative to said abutments when said part cylindrical portion is flattened.

4. A hose coupling as in claim 2 where said part cylindrical portion has ends that normally engage parts of said abutments but can be sprung out of engagement therewith.

5. A hose coupling as defined in claim 1, characterised in that said slot diverges from a narrow portion adjacent the said part cylindrical portion of said locking member to a wider portion opposite thereto to form guide surfaces for said legs, said legs having surfaces co-operating with said guide surfaces.

6. A hose coupling as defined in claim 5, characterized in that said legs are integral with said part cylindrical member and are spaced on opposite sides of the centre thereof, said legs extending parallel to each other and then diverging, each leg having a radially outer surface to engage a co-operating surface formed by said slot, and a radially inner surface to engage the annular groove on said subject.

7. A hose coupling, the coupling comprising a portion having a spigot adapted to be inserted into a socket in a second portion, said spigot having a sealing ring and an annular groove with the sealing ring adapted to seal in the socket of the second portion, said second portion having a transverse slot, a locking member co-operating with said slot, said locking member comprising a pair of legs attached to a part cylindrical portion, the legs being attached to the part cylindrical portion in such a manner that on straightening the part cylindrical portion the legs diverge, the legs being adapted to engage in said annular groove in said spigot member;

said slot diverging from a narrow portion adjacent the said part cylindrical portion of said locking member to a wider portion opposite thereto to form guide surfaces for said legs, said legs having surfaces co-operating with said guide surfaces;

said legs being integral with said part cylindrical member and being spaced on opposite sides of the center thereof, said legs extending parallel to each other and then diverging, each leg having a radially outer surface to engage a co-operating surface formed by said slot, and a radially inner surface to engage the annular groove on said spigot; and each leg increasing in dimension radially from the part cylindrical member to the outer end of the legs, each leg being provided with a hook on its radially outer surface at its outer end to engage a ledge formed by a cut out crossing said slot to retain the locking member in its non-engaged position.

* * * * *